(12) United States Patent
Palmer et al.

(10) Patent No.: US 12,158,877 B2
(45) Date of Patent: *Dec. 3, 2024

(54) GLOBAL UNIQUENESS CHECKING IN DISTRIBUTED DATABASES

(71) Applicant: Dassault Systemes SE, Velizy Villacoublay (FR)

(72) Inventors: Trek S. Palmer, Cambridge, MA (US); James A. Starkey, Manchester, MA (US)

(73) Assignee: Dassault Systemes SE, Velizy Villacoublay (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/156,806

(22) Filed: Jan. 19, 2023

(65) Prior Publication Data
US 2023/0229655 A1 Jul. 20, 2023

Related U.S. Application Data

(63) Continuation of application No. 16/926,846, filed on Jul. 13, 2020, now Pat. No. 11,561,961, which is a
(Continued)

(51) Int. Cl.
  *G06F 16/23* (2019.01)
  *G06F 11/14* (2006.01)
  *G06F 16/27* (2019.01)

(52) U.S. Cl.
  CPC ...... *G06F 16/2365* (2019.01); *G06F 11/1402* (2013.01); *G06F 16/27* (2019.01); *G06F 16/273* (2019.01)

(58) Field of Classification Search
  CPC .... G06F 16/2365; G06F 16/27; G06F 16/273; G06F 11/1402
(Continued)

(56) References Cited

U.S. PATENT DOCUMENTS 4,733,353 A * 3/1988 Jaswa ................. G06F 11/1691
  713/375
4,853,843 A 8/1989 Ecklund
(Continued)

FOREIGN PATENT DOCUMENTS

CN 101471845 A 7/2009
CN 101251843 B 6/2010
(Continued)

OTHER PUBLICATIONS

"Album Closing Policy," Background, retrieved from the Internet at URL:http://tools/wiki/display/ENG/Album+Closing+Policy (Jan. 29, 2015), 4 pp.
(Continued)

*Primary Examiner* — Phong H Nguyen
(74) *Attorney, Agent, or Firm* — Smith Baluch LLP

(57) ABSTRACT

A distributed database processing system for a database composed of data records organized into tables which processes unique index atoms consistently and concurrently. Each attempt to insert a new key value into such a unique index atom in any given node is routed to a unique index atom chairman for processing. The chairman determines whether the request will be granted. If the request is not granted, the requesting unique index atom continues to try to submit the insert. If the request is granted, the requesting unique index atom modifies the content thereof and broadcasts a replicated given unique index atom all other nodes that contain the replicated unique index atom.

17 Claims, 7 Drawing Sheets

Related U.S. Application Data continuation of application No. 14/215,461, filed on Mar. 17, 2014, now Pat. No. 10,740,323.

(60) Provisional application No. 61/789,671, filed on Mar. 15, 2013.

(58) Field of Classification Search
USPC .......................................... 707/610, 613, 691
See application file for complete search history.

(56) References Cited

U.S. PATENT DOCUMENTS

| | | |
|---|---|---|
| 5,446,887 A | 8/1995 | Berkowitz |
| 5,524,240 A | 6/1996 | Barbara et al. |
| 5,555,404 A | 9/1996 | Torbjornsen et al. |
| 5,568,638 A | 10/1996 | Hayashi et al. |
| 5,625,815 A | 4/1997 | Maier et al. |
| 5,701,467 A | 12/1997 | Freeston |
| 5,764,877 A | 6/1998 | Lomet et al. |
| 5,806,065 A | 9/1998 | Lomet |
| 5,960,194 A | 9/1999 | Choy et al. |
| 6,216,151 B1 | 4/2001 | Antoun |
| 6,226,650 B1 | 5/2001 | Mahajan et al. |
| 6,275,863 B1 | 8/2001 | Eff et al. |
| 6,334,125 B1 | 12/2001 | Johnson et al. |
| 6,401,096 B1 | 6/2002 | Zellweger |
| 6,424,967 B1 | 7/2002 | Johnson et al. |
| 6,480,857 B1 | 11/2002 | Chandler |
| 6,499,036 B1 | 12/2002 | Gurevich |
| 6,523,036 B1 | 2/2003 | Hickman et al. |
| 6,748,394 B2 | 6/2004 | Shah et al. |
| 6,792,432 B1 | 9/2004 | Kodavalla et al. |
| 6,862,589 B2 | 3/2005 | Grant |
| 7,026,043 B2 | 4/2006 | Jander |
| 7,080,083 B2 | 7/2006 | Kim et al. |
| 7,096,216 B2 | 8/2006 | Anonsen |
| 7,184,421 B1 | 2/2007 | Liu et al. |
| 7,219,102 B2 | 5/2007 | Zhou et al. |
| 7,233,960 B1 | 6/2007 | Boris et al. |
| 7,293,039 B1 | 11/2007 | Deshmukh et al. |
| 7,353,227 B2 | 4/2008 | Wu |
| 7,395,352 B1 | 7/2008 | Lam et al. |
| 7,401,094 B1 | 7/2008 | Kesler |
| 7,403,948 B2 | 7/2008 | Ghoneimy et al. |
| 7,562,102 B1 | 7/2009 | Sumner et al. |
| 7,853,624 B2 | 12/2010 | Friedlander et al. |
| 7,890,508 B2 | 2/2011 | Gerber et al. |
| 8,108,343 B2 | 1/2012 | Wang et al. |
| 8,122,201 B1 | 2/2012 | Marshak et al. |
| 8,224,860 B2 | 7/2012 | Starkey |
| 8,266,122 B1 | 9/2012 | Newcombe et al. |
| 8,504,523 B2 | 8/2013 | Starkey |
| 8,756,237 B2 | 6/2014 | Stillerman et al. |
| 8,930,312 B1 * | 1/2015 | Rath .................... G06F 16/278 707/634 |
| 9,008,316 B2 * | 4/2015 | Acar .................... H04L 9/0819 380/278 |
| 9,501,363 B1 | 11/2016 | Ottavio |
| 9,734,021 B1 | 8/2017 | Sanocki et al. |
| 9,824,095 B1 | 11/2017 | Taylor et al. |
| 10,740,323 B1 | 8/2020 | Palmer et al. |
| 11,176,111 B2 | 11/2021 | Palmer et al. |
| 11,561,961 B2 | 1/2023 | Palmer et al. |
| 11,573,940 B2 | 2/2023 | Dashevsky |
| 2002/0112054 A1 | 8/2002 | Hatanaka |
| 2002/0152261 A1 | 10/2002 | Arkin et al. |
| 2002/0152262 A1 | 10/2002 | Arkin et al. |
| 2002/0178162 A1 | 11/2002 | Ulrich et al. |
| 2003/0051021 A1 | 3/2003 | Hirschfeld et al. |
| 2003/0149709 A1 | 8/2003 | Banks |
| 2003/0204486 A1 | 10/2003 | Berks et al. |
| 2003/0220935 A1 | 11/2003 | Vivian et al. |
| 2004/0153459 A1 | 8/2004 | Whitten et al. |
| 2004/0263644 A1 | 12/2004 | Ebi |
| 2005/0013208 A1 | 1/2005 | Hirabayashi et al. |
| 2005/0086384 A1 | 4/2005 | Ernst |
| 2005/0198062 A1 | 9/2005 | Shapiro |
| 2005/0216502 A1 | 9/2005 | Kaura et al. |
| 2006/0010130 A1 | 1/2006 | Leff et al. |
| 2006/0168154 A1 | 7/2006 | Zhang et al. |
| 2007/0067349 A1 | 3/2007 | Jhaveri et al. |
| 2007/0156842 A1 * | 7/2007 | Vermeulen .......... H04L 67/1097 709/217 |
| 2007/0288526 A1 | 12/2007 | Mankad et al. |
| 2008/0086470 A1 | 4/2008 | Graefe |
| 2008/0106548 A1 | 5/2008 | Singer |
| 2008/0228795 A1 | 9/2008 | Lomet |
| 2008/0320038 A1 | 12/2008 | Liege |
| 2009/0113431 A1 | 4/2009 | Whyte |
| 2009/0183175 A1 * | 7/2009 | Walker .................. G06Q 10/10 707/999.1 |
| 2010/0094802 A1 | 4/2010 | Luotojarvi et al. |
| 2010/0115246 A1 | 5/2010 | Seshadri et al. |
| 2010/0153349 A1 | 6/2010 | Schroth et al. |
| 2010/0191884 A1 | 7/2010 | Holenstein et al. |
| 2010/0235606 A1 | 9/2010 | Oreland et al. |
| 2010/0297565 A1 | 11/2010 | Waters et al. |
| 2011/0087874 A1 | 4/2011 | Timashev et al. |
| 2011/0231447 A1 * | 9/2011 | Starkey ................ G06F 16/27 707/E17.055 |
| 2012/0096043 A1 * | 4/2012 | Stevens, Jr. ......... G06F 16/9024 707/E17.011 |
| 2012/0136904 A1 | 5/2012 | Ravi |
| 2012/0254175 A1 | 10/2012 | Horowitz et al. |
| 2013/0060922 A1 | 3/2013 | Koponen et al. |
| 2013/0086018 A1 | 4/2013 | Horii |
| 2013/0110766 A1 | 5/2013 | Promhouse et al. |
| 2013/0110774 A1 | 5/2013 | Shah et al. |
| 2013/0110781 A1 | 5/2013 | Golab et al. |
| 2013/0159265 A1 | 6/2013 | Peh et al. |
| 2013/0159366 A1 | 6/2013 | Lyle et al. |
| 2013/0232378 A1 | 9/2013 | Resch et al. |
| 2013/0259234 A1 * | 10/2013 | Acar ...................... H04L 9/088 380/278 |
| 2013/0262403 A1 | 10/2013 | Milousheff et al. |
| 2013/0278412 A1 | 10/2013 | Kelly et al. |
| 2013/0297565 A1 | 11/2013 | Starkey |
| 2013/0311426 A1 | 11/2013 | Erdogan et al. |
| 2014/0108414 A1 | 4/2014 | Stillerman et al. |
| 2014/0258300 A1 | 9/2014 | Baeumges et al. |
| 2014/0279881 A1 | 9/2014 | Tan et al. |
| 2014/0297676 A1 | 10/2014 | Bhatia et al. |
| 2014/0304306 A1 | 10/2014 | Proctor et al. |
| 2015/0019739 A1 | 1/2015 | Attaluri et al. |
| 2015/0032695 A1 | 1/2015 | Tran et al. |
| 2015/0066858 A1 | 3/2015 | Sabdar et al. |
| 2015/0135255 A1 | 5/2015 | Theimer et al. |
| 2015/0370505 A1 | 12/2015 | Shuma et al. |
| 2016/0134490 A1 | 5/2016 | Balasubramanyan et al. |
| 2016/0350392 A1 | 12/2016 | Rice et al. |
| 2016/0371355 A1 | 12/2016 | Massari et al. |
| 2017/0039099 A1 | 2/2017 | Ottavio |
| 2017/0139910 A1 | 5/2017 | Mcalister et al. |
| 2022/0035786 A1 | 2/2022 | Palmer et al. |

FOREIGN PATENT DOCUMENTS

| | | |
|---|---|---|
| CN | 101268439 B | 4/2012 |
| EA | 002931 B1 | 10/2002 |
| EP | 1403782 A2 | 3/2004 |
| JP | 2003256256 A | 9/2003 |
| JP | 2006048507 A | 2/2006 |
| JP | 2007058275 A | 3/2007 |
| RU | 2315349 C1 | 1/2008 |
| RU | 2008106904 A | 8/2009 |
| WO | 2010034608 A1 | 4/2010 |

OTHER PUBLICATIONS

"Distributed Coordination in NuoDB," YouTube, retrieved from the Internet at URL:https://www.youtube.com/watch?feature=player_embedded&v=URoeHvflVKg on Feb. 4, 2015, 2 pp.

(56) References Cited

OTHER PUBLICATIONS

"Durable Distributed Cache Architecture", retrieved from the Internet at URL: http://www.nuodb.com/explore/newsql-cloud-database-ddc-architecture on Feb. 4, 2015, 3 pages.
"Glossary-NuoDB 2.1 Documentation / NuoDB," retrieved from the Internet at URL: http://doc.nuodb.com/display/doc/Glossary on Feb. 4, 2015, 1 pp.
"How It Works," retrieved from the Internet at URL: http://www.nuodb.com/explore/newsql-cloud-database-how-it-works?mkt_tok=3RkMMJW on Feb. 4, 2015, 4 pp.
"How to Eliminate MySQL Performance Issues," NuoDB Technical Whitepaper, Sep. 10, 2014, Version 1, 11 pp.
"Hybrid Transaction and Analytical Processing with NuoDB," NuoDB Technical Whitepaper, Nov. 5, 2014, Version 1, 13 pp.
"No Knobs Administration," retrieved from the Internet at URL: http://www.nuodb.com/explore/newsql-cloud-database-product/auto-administration on Feb. 4, 2015, 4 pp.
"NuoDB at a Glance," retrieved from the Internet at URL: http://doc.nuodb.com/display/doc/NuoDB+at+a+Glance on Feb. 4, 2015, 1 pp.
"SnapShot Albums," Transaction Ordering, retrieved from the Internet at URL:http://tools/wiki/display/ENG/Snapshot+Albums (Aug. 12, 2014), 4 pp.
"Table Partitioning and Storage Groups (TPSG)," Architect's Overview, NuoDB Technical Design Document, Version 2.0 (2014), 12 pp.
"The Architecture & Motivation for NuoDB," NuoDB Technical Whitepaper, Oct. 5, 2014, Version 1, 27 pp.
"Welcome to NuoDB Swifts Release 2.1 GA," retrieved from the Internet at URL: http://dev.nuodb.com/techblog/welcome-nuodb-swifts-release-21-ga on Feb. 4, 2015, 7 pp.
"What Is a Distributed Database? and Why Do You Need One," NuoDB Technical Whitepaper, Jan. 23, 2014, Version 1, 9 pp.
Amazon CloudWatch Developer Guide API, Create Alarms That or Terminate an Instance, Jan. 2013, downloaded Nov. 16, 2016 from archive.org., pp. 1-11.
Amazon RDS FAQs, Oct. 4, 2012, 39 pages.
Bergsten et al., "Overview of Parallel Architectures for Databases," The Computer Journal vol. 36, No. 8, pp. 734-740 (1993).
Connectivity Testing with Ping, Telnet, Trace Route and NSlookup (hereafter help.webcontrolcenter), Article ID:1757, Created: Jun. 17, 2013 at 10:45 a.m., https://help.webcontrolcenter.com/kb/a1757/connectivity-testing-with-ping-telnet-trace-route-and-nslookup.aspx, 6 pages.
Dan et al., "Performance Comparisons of Buffer Coherency Policies," Proceedings of the International Conference on Distributed Computer Systems, IEEE Comp. Soc. Press vol. 11, pp. 208-217 (1991).
Extended European Search Report in European Patent Application No. 18845799.8 dated May 25, 2021, 8 pages.
Final Office Action dated Nov. 24, 2017 from U.S. Appl. No. 14/215,401, 33 pages.
Final Office Action dated Nov. 3, 2016 from U.S. Appl. No. 14/215,401, 36 pp.
Final Office Action dated Sep. 9, 2016 from U.S. Appl. No. 14/215,461, 26 pp.
First Examination Report issued by the Canadian Intellectual Property Office for Application No. 2,793,429, dated Feb. 14, 2017, 3 pages.
Garding, P. "Alerting on Database Mirorring Events," Apr. 7, 2006, downloaded Dec. 6, 2016 from technet.microsoft.com, 24 pp.
Hull, Autoscaling MySQL on Amazon EC2, Apr. 9, 2012, 7 pages.
International Search Report and Written Opinion in International Patent Application No. PCT/US18/00142 mailed Dec. 13, 2018. 11 pages.
Iqbal et al., "Performance Tradeoffs in Static and Dynamic Load Balancing Strategies," Institute for Computer Applications in Science and Engineering, 1986, pp. 1-23.
Leverenz et al., "Oracle8i Concepts, Partitioned Tables and Indexes," Chapter 11, pp. Nov. 12, 11/66 (1999).
Non-Final Office Action dated Jan. 21, 2016 from U.S. Appl. No. 14/215,401, 19 pp.
Non-Final Office Action dated May 31, 2017 from U.S. Appl. No. 14/215,401, 27 pp.
Office Action with translation in Korean Application No. 10-2020-7006901 dated Dec. 16, 2022, 30 pages.
Oracle Database Concepts 10g Release 2 (10.2), Oct. 2005, 14 pages.
Rahimi, S. K et al., "Distributed Database Management Systems: A Practical Approach," IEEE Computer Society, John Wiley & Sons, Inc. Publications (2010), 765 pp.
Roy, N. et al., "Efficient Autoscaling in the Cloud using Predictive Models for Workload Forecasting," IEEE 4th International Conference on Cloud Computing, 2011, pp. 500-507.
Searchcloudapplications.techtarget.com, Autoscaling Definition, Aug. 2012, 1 page.
Shaull, R. et al., "A Modular and Efficient Past State System for Berkeley DB," Proceedings of USENIX ATC '14:2014 USENIX Annual Technical Conference, 13 pp. (Jun. 19-20, 2014).
Shaull, R., "Retro: A Methodology for Retrospection Everywhere," A Dissertation Presented to the Faculty of the Graduate School of Arts and Sciences of Brandeis University, Waltham, Massachusetts, Aug. 2013, 174 pp.
Veerman, G. et al., "Database Load Balancing, MySQL 5.5 vs PostgreSQL 9.1," Universiteit van Amsterdam, System & Network Engineering, Apr. 2, 2012, 51 pp.
Yousif, M. "Shared-Storage Clusters," Cluster Computing, Baltzer Science Publishers, Bussum, NL, vol. 2, No. 4, pp. 249-257 (1999).

\* cited by examiner

INDEX ATOM 76

| 76A | INDEX ATOM ID |
|---|---|
| 76B | POINTER TO MASTER CATALOG |
| 76C | POINTER TO CREATING CATALOG |
| 76D | POINTER TO CHAIRMAN |
| 76E | CHANGE NUMBER |
| 76F | LIST OF RELAYS |
| 76G | CYCLE REFERENCE |
| 76H | ACTIVE NODE LIST |
| 76I | STATUS STATES |
| 76J | BINARY TREE OF INDEX NODES |
| 76K | INDEX LEVEL |
| 76L | |
| 76M | |

FIG. 4

| | MESSAGES |
|---|---|
| 150 | INDEX NODE ADDED |
| 151 | TABLE INDEX READY |
| 160 | INSERT REQUEST |
| 161 | INSERT STATUS |

GLOBAL UNIQUENESS CHECKING IN DISTRIBUTED DATABASES

CROSS REFERENCE TO RELATED PATENT

This application is a continuation of U.S. application Ser. No. 16/926,846, filed Jul. 13, 2020, which is a continuation of U.S. application Ser. No. 14/215,461, filed Mar. 17, 2014, which in turn claims priority from U.S. Provisional Patent Application No. 61/789,671, filed Mar. 15, 2013. Each of these applications is incorporated hereby herein by reference in its entirety.

U.S. Pat. No. 8,224,860 granted Jul. 17, 2012 for a Database Management System and assigned to the same assignee as this invention is incorporated in its entirety herein by reference.

BACKGROUND OF THE INVENTION

Field of the Invention

This invention generally relates to database management systems and more specifically to a methodology for maintaining unique indexes in a distributed database composed of data records organized into tables.

In many databases unique indexes maintain data integrity by insuring that no two rows (or records) of data in a table have identical key values. That is, in a unique index an indexed key value can only exist in one row or record. An example of such a unique index in a credit card database is the customer's credit card number. Any index to that credit card number must assure that a given credit card number is only assigned to one individual; that is, only appears in one row or record of a corresponding logical table. So, steps must be taken to insure that two users do not attempt to assign the same credit card number to two different individuals; that is, two users do not try to place the same or different index values in one row. Databases that maintain such a function are known as being consistent and concurrent. Several methods have been implemented to assure the consistency and concurrency of such indexes. A popular method involves quiescing operations so that while one index is being updated, any other attempt is blocked. This approach has been implemented in non-shared databases where only a single copy of the index exists. Often these methods involved quiescing the entire database.

The above-identified U.S. Pat. No. 8,224,860 discloses a distributed database management system comprising a network of transactional nodes and archival nodes. Archival nodes act as storage managers for all the data in the database. Each user connects to a transactional node to perform operations on the database by generating queries for processing at that transactional node. A given transactional node need only contain that data and metadata as required to process queries from users connected to that node. This distributed database is defined by an array of atom classes, such as an index class and atoms where each atom corresponds to a different instance of the class, such as an index atom for a specific index. Replications or copies of an atom may reside in multiple nodes as needed. The atom copy in a given node is processed in that node.

In this implementation of the above-identified U.S. Pat. No. 8,224,860 asynchronous messages transfer among the different nodes to maintain database consistency and concurrency. Specifically, each node in the database network has a unique communication path to every other node. When one node generates a message involving a specific atom, it can communicate as necessary with those other nodes that also contain replications of that specific atom. Each node generates its messages independently of other nodes. So it is possible that, at any given instant, multiple nodes contain replications, or copies, of a given atom and that those different nodes may be at various stages of processing them. Consequently, operations in different nodes are not synchronized. It is necessary to provide a means for maintaining concurrency and consistency.

More specifically, in such a database management system, it is possible for multiple nodes to generate a message requesting an insert to add specific information into an index atom for a unique index. If multiple requests occur at different nodes within a short interval, a races problem exists that can produce an erroneous entry in the index atom. Prior methods, such as those involving quiescence, are not readily applicable to a distributed database management system of the type discussed above without introducing unacceptable system performance degradation. What is needed is a method for handling requested inserts to unique indexes in a distributed database management system.

SUMMARY

Therefore it is an object of this invention to provide a database management system for a distributed database that processes requested entries into a unique index in a consistent and concurrent fashion.

Another object of this invention is to provide a database management system for a distributed database that processes requested entries into a unique index in consistent and concurrent fashion without any significant performance degradation.

Yet another object of this invention is to provide a database management system for a distributed database that processes requested entries into a unique index that eliminates the involvement of nodes that do not include that unique index.

In accordance with this invention a unique index is maintained in a distributed database concurrently and consistently. The database is composed of data records organized into tables and is distributed over a plurality of interconnected transactional and archival nodes wherein a database management system defines a plurality of atom classes for different classes of data and metadata and one of said atom classes is an index class that produces a given index atom for a unique index in the database and wherein different nodes may include a replication of a given index atom, one copy of a replicated given index atom being designated a chairman. When another node with a replicated given index atom, a requesting node, seeks to insert a new entry into its local replicated given index atom, the requesting node initially inserts the entry into the local replicated given index atom., generates a local-only flag and transmits to the chairman a message requesting that the entry be inserted into the index atom. At the node containing the chairman, it is determined whether the requested entry is unique in the chairman's replicated given index atom. If the request is determined to be unique, the chairman accepts the entry and transmits a success message to the requesting node. The requesting node responds by clearing the local-only flag and by broadcasting its updated replicated given index atom to all other nodes containing a replicated given index atom whereby the index atom is maintained consistently and concurrently across all nodes.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 4 depicts the information in an Index atom that can be involved in the methodology of this invention;

DESCRIPTION OF ILLUSTRATIVE EMBODIMENTS

Figure 1:
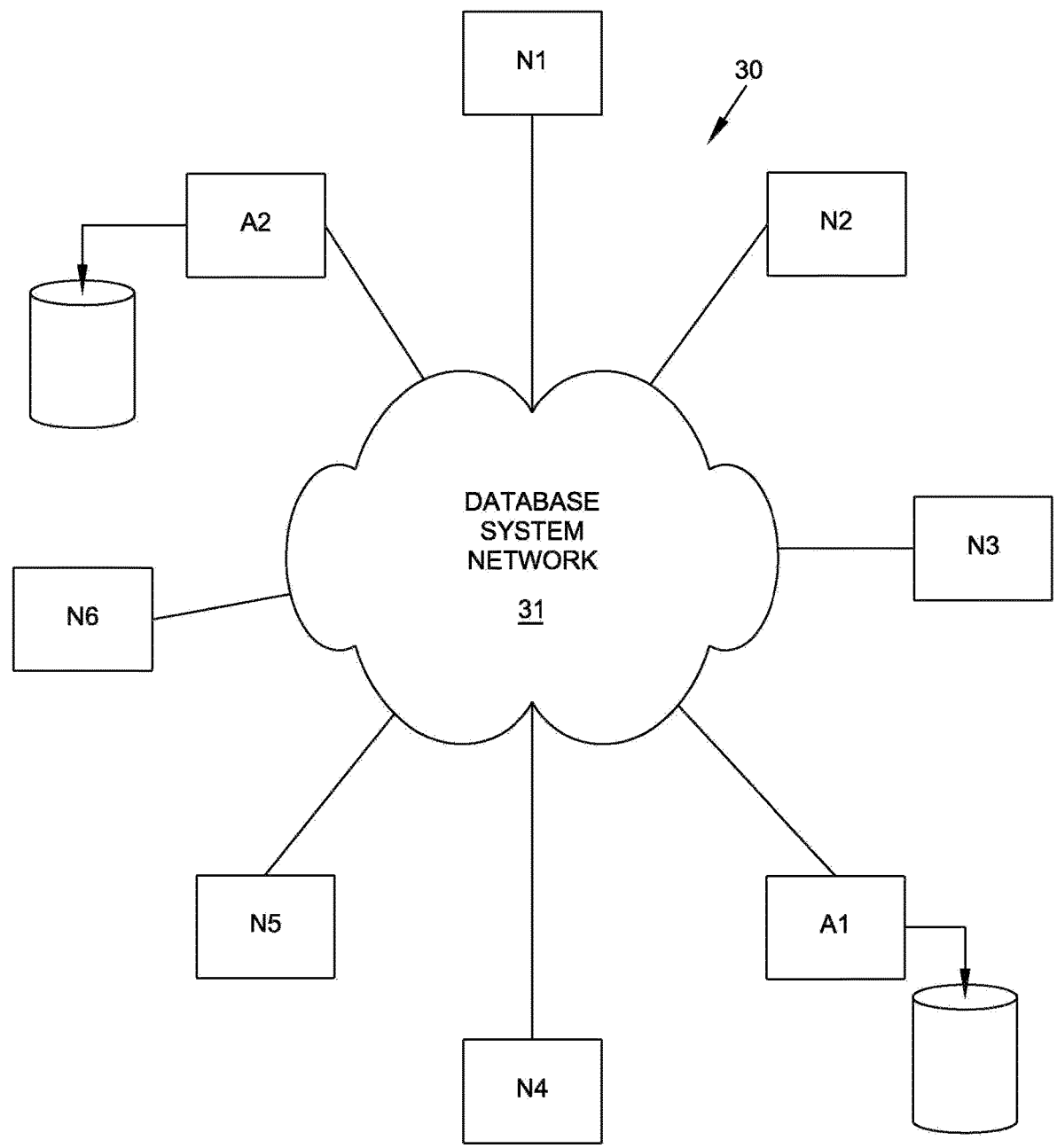
FIG. 1 is a diagram in schematic form of one embodiment of an elastic, scalable, on-demand, distributed data processing system that incorporates this invention.

A specific database management system in FIG. 1 is an elastic, scalable, on-demand, distributed database system 30 with a plurality of data processing nodes. Nodes N1 through N6 are "transactional nodes" that provide user applications access to the database; each of nodes A1 and A2 is an "archival node" and acts as a storage manager to maintain a disk archive of the entire database at each archival node. While an archival node normally stores the entire database, a single transactional node contains only that portion of the database it determines to be necessary to support transactions being performed at that transactional node at that time.

Each node in FIG. 1 can communicate directly with each other node in the system 30 through a database system network 31. For example, node N1 can establish a communications path with each of nodes N2 through N6, A1 and A2. Communications between any two nodes is by way of serialized messages. In one embodiment, the messaging is performed in an asynchronous manner to maximize the bandwidth used by the system thereby to perform various operations in a timely and prompt manner. Typically the database system network 31 will operate with a combination of high-bandwidth, low-latency paths (e.g., an Ethernet network) and high-bandwidth, high-latency paths (e.g., a WAN network). Each node has the capability to restrict use of a low-latency path to time-critical communications (e.g., fetching an atom). The high-latency path can be used for non-critical communications (e.g. a request to update information for a table). Also and preferably, the data processing network of this invention incorporates a messaging protocol, such as the Transmission Control Protocol (TCP) and assures that each node processes messages in the same sequence in which they were sent to it by other nodes.

Figure 2:
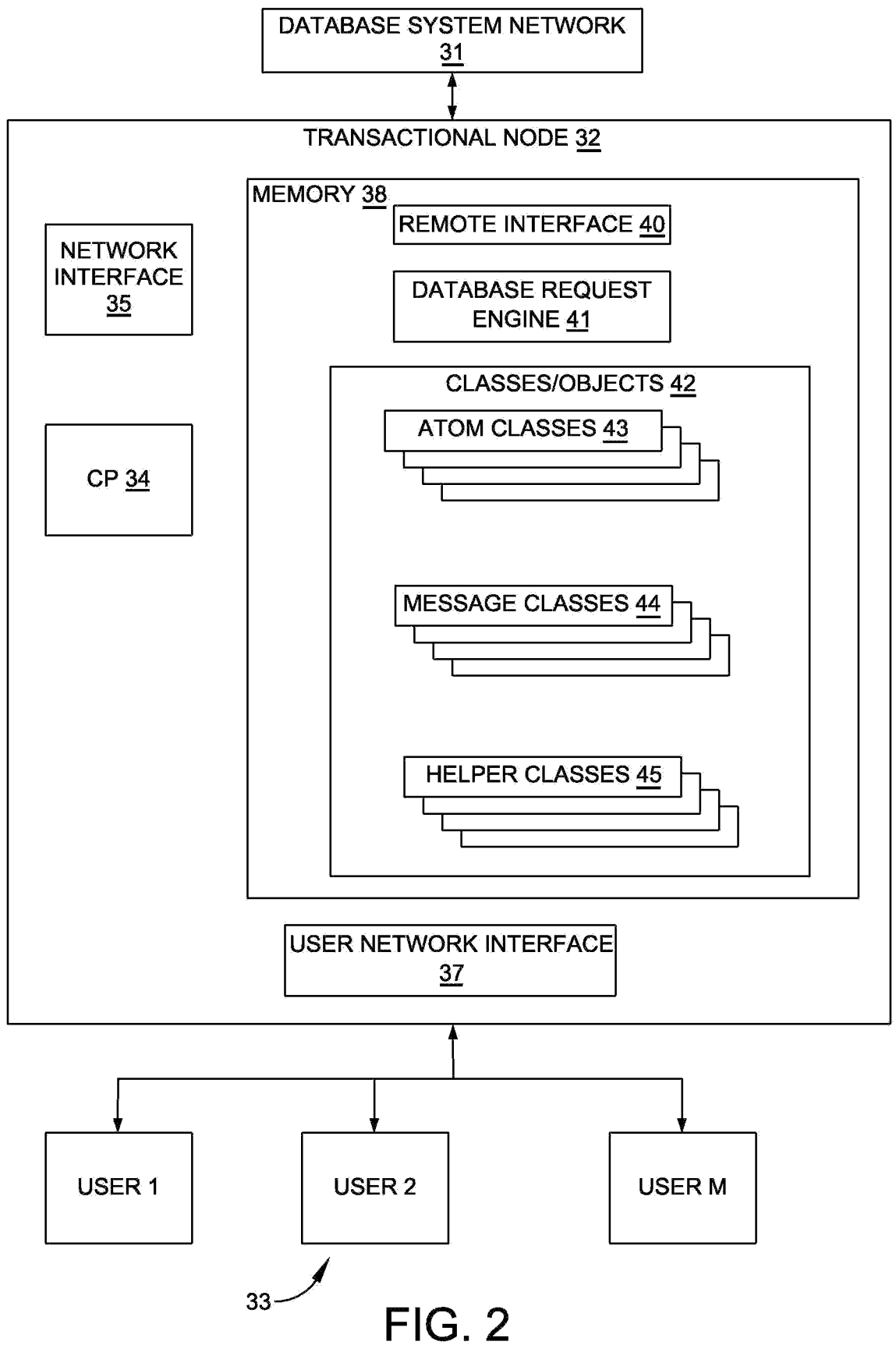
FIG. 2 depicts the organization of a transactional node.

FIG. 2 depicts a representative transactional node 32 that links to the database system network 31 and various end users 33. The transactional node 32 includes a central processing system (CP) 34 that communicates with the database system network 31 through a network interface 35 and with the various users through a user network interface 37. The central processing system 34 also interacts with RAM memory 38 that contains a copy of the database management program that implements this invention. This program functions to provide a remote interface 40, a database request engine 41 and a set 42 of classes or objects. The database request engine 41 only exists on transactional nodes and is the interface between the high-level input and output commands at the user level and system level input and output commands at the system level. In general terms, its database request engine parses, compiles and optimizes user queries such as SQL queries into commands that are interpreted by the various classes or objects in the set 42.

In this system, the classes/objects set 42 is divided into a subset 43 of "atom classes," a subset 44 of "message classes" and a subset 45 of "helper classes." Additional details of certain of these classes that are relevant to this invention are described. As will become apparent, at any given time a transactional node only contains those portions of the total database that are then relevant to active user applications. Moreover, the various features of this distributed database management system enable all portions of database in use at a given time to be resident in random access memory 38. There is no need for providing supplementary storage, such as disk storage, at a transactional node during the operation of this system.

Figure 3A:
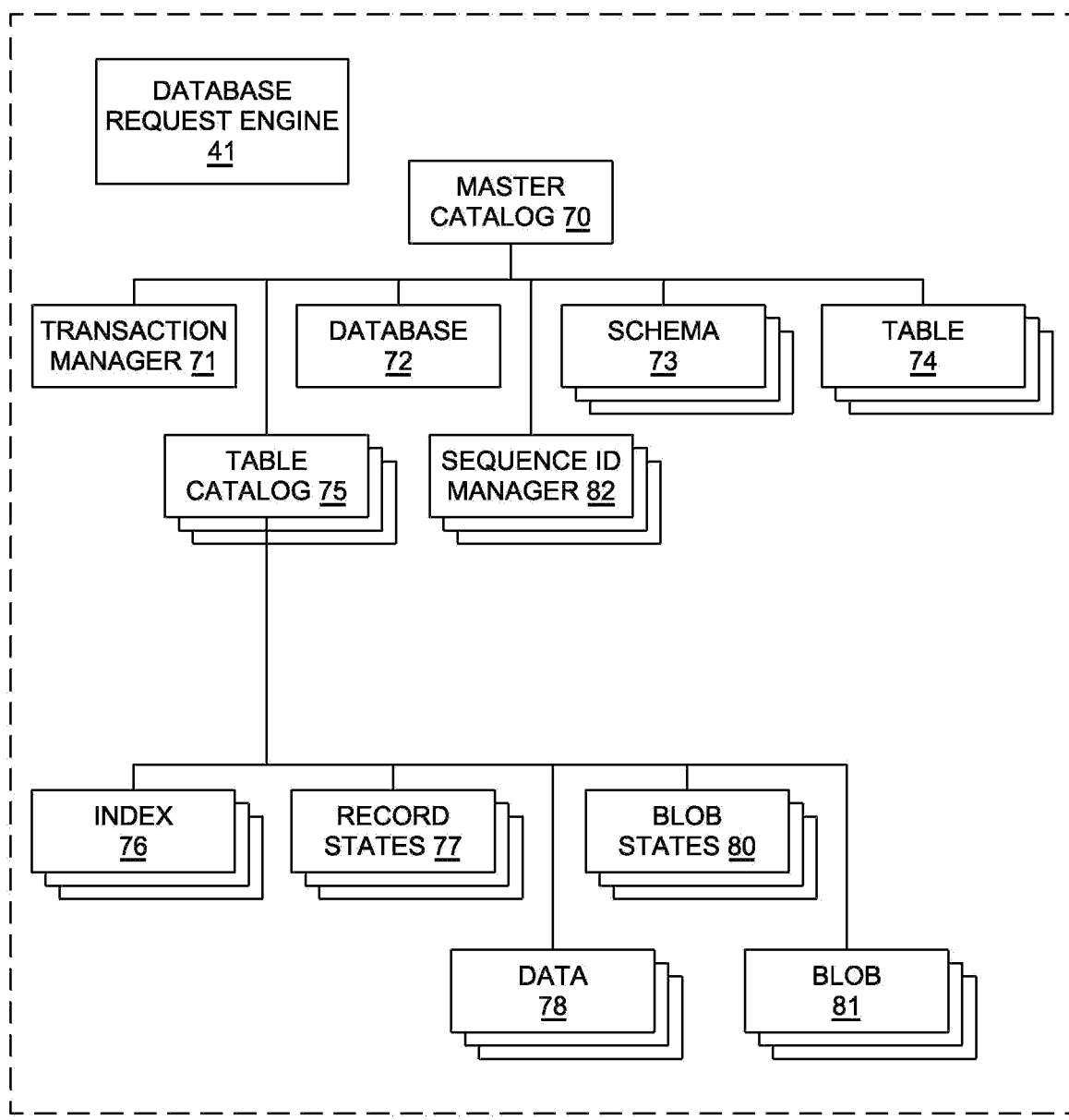
FIGS. 3A and 3B depict the logical organization of "atom" objects generated by atom classes shown in FIG. 2 that are useful in implementing this invention and that might appear at any given time in a transactional node.

Referring to FIG. 3A, a Master Catalog atom 70 tracks the status of transactional and archival nodes in database system 30 of FIG. 1. It also can be considered as an active index that creates and monitors the Transaction Manager atom 71, the Database atom 72, each Schema atom 73, each corresponding set of Table atoms 74 and Table Catalog atoms 75, and Sequence ID Managers 82. The Table Catalog atom 75 acts as an active index and creates and monitors Index atoms 76, Record States atoms 77, Data atoms 78, Blob States atoms 80 and Blob atoms 81 associated with a single table. There is one Table Catalog atom 75 for each table.

Figure 3B:
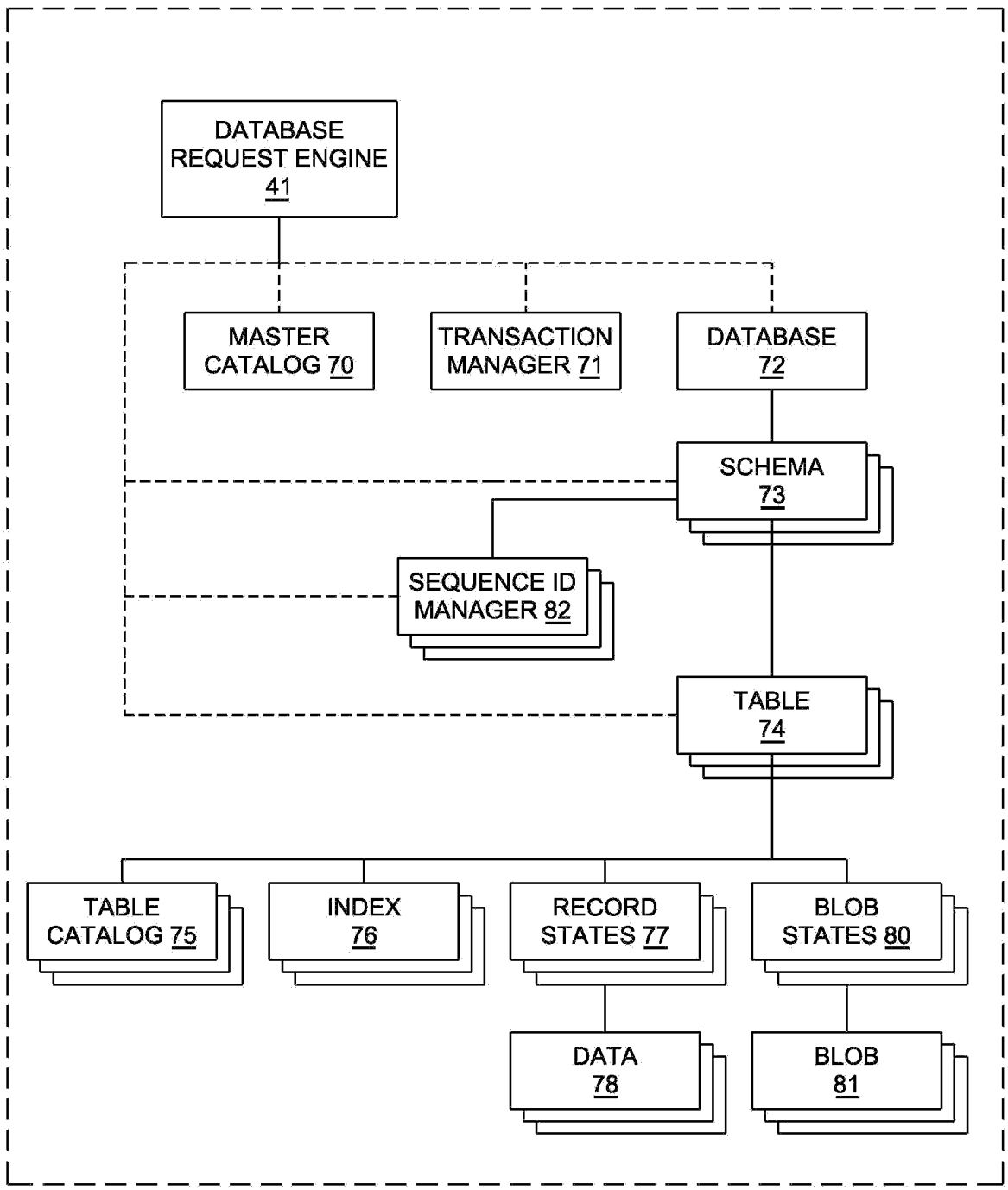

FIG. 3B is useful in understanding the interaction and management of different atom types. In this context, neither the Master Catalog atom 70 nor the Table Catalog atom 75 performs any management functions. With respect to the remaining atoms, the Database atom 72 manages each Schema atom 73. Each Schema atom 73 manages each related Table atom 74 and Sequence ID Manager atom 82. Each Table atom 74 manages its corresponding Table Catalog atom 75, Index atoms 76, Record States atoms 77, Data atoms 78, Blob States atom 80 and Blob atoms 81. Still referring to FIG. 3B, the database request engine 41 communicates with the Master Catalog atom 70, Transaction Manager atom 71, the Database atom 72, each Schema atom 73, each Table atom 74 and the Sequence ID Managers 82. The database request engine 41 acts as compiler for a high-level language such as SQL. As a compiler, it parses, compiles and optimizes queries and obtains metadata and data from atoms for the formation of the various fragments of data base information.

Each atom has certain common elements and other elements that are specific to its type. FIG. 4 depicts an index atom 76 that is the subject of this invention. Element 76A is a unique identification for the index atom 76. Pointers 76B and 76C identify a master catalog atom and the creating catalog atom, respectively. Each atom must have a chairman that performs functions as described later. Element 76D points to the node where the chairman for that atom resides.

Each time a copy of an atom is changed in any transactional node, it receives a new change number. Element 76E records that change number. Whenever a node requests an atom from another node, there is an interval during which time the requesting node will not be known to other transactional nodes. Element 76F is a list of all the nodes to which the supplying node must relay messages that contain the atom until the request is completed.

Operations of the database system are also divided into cycles. A cycle reference element 76G provides the cycle number of the last access to the atom. Element 76H is a list of the all active nodes that contain the atom. Element 76I includes several status indicators. Elements 76J contains a binary tree of index nodes to provide a conventional indexing function. Element 76K contains an index level. Such index structures and operations are known to those in skilled in the art.

Figures 5, 6:
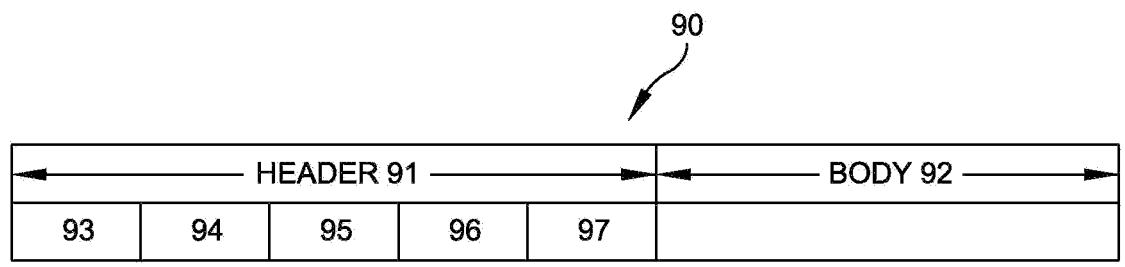
FIG. 5 depicts the syntax of an exemplary asynchronous message that transfers between the transactional and archival nodes of the database system of FIG. 1.
FIG. 6 depicts messages that are useful in implementing an embodiment of this invention.

As previously indicated, communications between any two nodes is by way of serialized messages which are transmitted asynchronously using the TCP or another protocol with controls to maintain messaging sequences. FIG. 5 depicts the basic syntax of a typical message 90 that includes a variable-length header 91 and a variable-length body 92. The header 91 includes a message identifier code 93 that specifies the message and its function. As this invention envisions a scenario under which different nodes may operate with different software versions, the header 91 also includes identification 94 of the software version that created the message. The remaining elements in the header include a local identification 95 of the sender and information 96 for the destination of the message and atom identification 97. From this information, a recipient node can de-serialize, decode and process the message.

FIG. 6 depicts four messages that are used in one embodiment of this invention. Each time an index node is added to the index, an Index Node Added message 150 shown in FIG. 6 is generated that contains an index key, record identification and other information for the new index. When a new index has been fully populated and therefore is ready for use, a Table Index Ready message 151 is generated that can also convert a write-only index into a readable index. An Insert Request message 160 is generated when a non-chairman node seeks to insert a key value into an existing index atom with a unique index. This message is sent to the chairman. A transmitted Insert Status message 161 updates the status of the operation in the non-chairman node as described more fully with respect to the flow diagram of FIG. 7.

Figure 7:
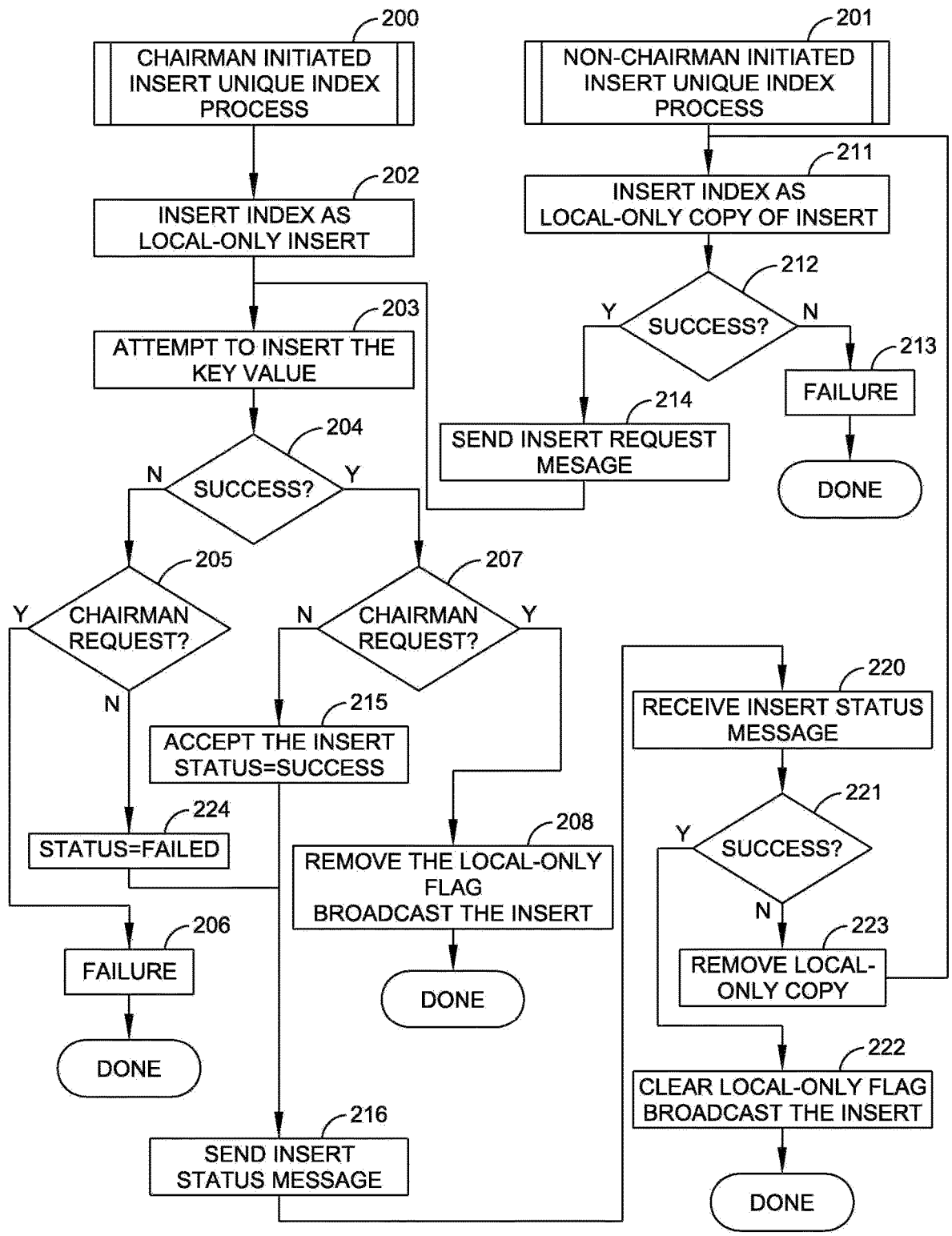
FIG. 7 is a flow diagram useful in understanding a method by which a request for insertion of a key value into a unique index atom occurs.

With this as background, FIG. 7 depicts the process by which a replicated index atom at the node containing the chairman or a replicated index atom at any other node can attempt to insert a key value. This processing is conducted at the node containing the chairman for the index atom to receive the key value. If the requesting node is the chairman, it initiates a "chairman-initiated insert unique index" process 200 in FIG. 7. If the requesting node is not the chairman, that node initiates "non-chairman insert unique index" process 201.

Referring to the process 200, the chairman sets a "local-only" flag in step 202 to indicate that the insert process is underway. The "local-only" flag can be a component of the status states element 76I in FIG. 4. Still referring to FIG. 7, the chairman attempts to insert that key value into its replicated index atom in step 203. If the attempt is not successful, steps 204 and 205 transfer control to step 206 to produce a "failure" message 206 and the process 200 terminates, generally with some notice of the failure.

If step 204 determines that the attempt is successful, step 204 control transfers to step 207. In step 208 the chairman first clears the "local-only" flag associated with the inserted key and then broadcasts the modified index atom to all other nodes that contain a replication of that index atom. More specifically, the chairman transmits an Index Node Added message 150 in FIG. 6 to all relevant nodes. When the chairman broadcasts a Node Added message to all its peers, the process 200 is done.

When a non-chairman attempts to insert anew index key value in the process 201, step 211 attempts to insert the key value in the index atom and sets a local-only flag associated with the inserted key. If this attempt fails, step 212 diverts control to step 213 whereupon further processing terminates and a failure indication is generated. As will be apparent, a failure means that the modified index was in conflict with the contents of the existing index atom at the requesting node.

If, however, the insert index is entered, step 212 diverts control to step 214 whereupon the non-chairman attempts to send an Insert Request message, such as the Insert Request message 160 in FIG. 6, to the chairman that then attempts to insert the entry into its corresponding replication of the index atom. The Insert Request message identifies itself as the requesting node and contains the index atom identification, the key value and the proposed table row or record. The chairman uses step 203 to evaluate the "Insert Request" message and determine whether the new key value can be inserted as proposed. If it can, steps 204 and 206 transfer control to step 215 wherein the chairman accepts the modified index and sets a status flag to a "success" state. In step 216 the chairman forms an "Insert Status" message 161, as shown in FIG. 6, and transmits it to the non-chairman requesting index atom.

In step 220, the requesting non-chairman node processes this Insert Status message. If the Insert Status message indicates that the chairman had accepted the modification to the insert atom, step 221 transfers control to step 222 that clears the local-only flag that was set in step 211.

If the non-chairman request is not inserted by the chairman in step 203, an Insert Status message is generated with a failed state at step 224 and transmitted at step 216 whereupon step 221 diverts to step 223 that removes the local-only flag for the specific key value status of the insert in the requesting node. Then control returns to step 211 to repeat the process. Such a situation may result when the index atom has been updated by a previous request from node N2 in FIG. 1 and the node N4 makes a request before processing the broadcast from node N2. The return from step 223 to step 211 will continue until node N4 processes the message. During the next iteration, steps 212 and 213 will cause the failure and the process will terminate.

Thus in the case of an insert request by either the chairman or a non-chairman, the chairman is the sole arbiter of whether an index atom is updated with a new key value. In either case, the modified index atom is also replicated to all other nodes containing that index atom. Thus, such an index atom modification occurs consistently and concurrently.

With this understanding, it will be apparent that a database management system for a distributed database that processes requested entries into a unique index atom in accordance with this invention does so in an orderly fashion so that the all copies of the index atom remains remain in a consistent and concurrent state. This method does not introduce any significant performance degradation of those nodes that contain a copy of the unique index atom. Moreover, the process operates without any involvement of nodes that do not include that unique index atom.

This invention has been disclosed in terms of certain embodiments. It will be apparent that many modifications can be made to the disclosed apparatus without departing from the invention. Therefore, it is the intent of the appended

What is claimed as new and desired to be secured by Letters Patent of the United States is:

1. A transactional node in a distributed database, the transactional node comprising:
    a processor;
    a network interface to receive a request to insert a new key value into an index atom, the index atom comprising a fragment of data and/or metadata associated with an index of a table included in the distributed database;
    a memory, operably coupled to the processor and storing a local copy of an index atom and a database management program, which, when executed by the processor, causes the transactional node to:
        provide a database request engine that parses, compiles, and optimizes user queries into commands that are interpreted by database objects in the distributed database;
        determine, using the database request engine in response to the request to insert the new key value into the index atom, if new key value is unique;
        in response to determining that the new key value is unique, (i) insert the new key value into the local copy of the index atom and (ii) broadcast instructions, to other nodes in the distributed database containing copies of the index atom, to insert the new key value into the index atom; and
        in response to determining that the new key value is not unique, generate a failure message.

2. The transactional node of claim 1, wherein the request indicates that the new key value should be inserted into all copies of the index atom in the distributed database and identifies (i) the index atom, (ii) the new key value, and (iii) a proposed table row and/or record in the distributed database.

3. The transactional node of claim 1, wherein the transactional node is configured to determine if the new key value is unique by testing the new key value for uniqueness against the local copy of the index atom.

4. The transactional node of claim 1, wherein the transactional node is configured to determine if the new key value by determining that no two rows of data in the table have identical key values.

5. The transactional node of claim 1, wherein the transactional node is further configured to generate a local-only flag associated with the new key value.

6. The transactional node of claim 5, wherein the transactional node is further configured to clear the local-only flag associated with the new key value in response to the instructions from another node in the distributed database.

7. The transactional node of claim 1, wherein the transactional node is further configured to initiate insertion of the new key value into the index atom.

8. The transactional node of claim 1, wherein the transactional node is further configured to remove the new key value from the local copy of the index atom in response to another node in the distributed database determining that the new key value is not unique.

9. The transactional node of claim 1, wherein the new key value identifies a unique row in the table.

10. A distributed database comprising:
    nodes comprising respective central processing systems and respective memories to store (i) a database management program, which when executed by the central processing systems causes the nodes to provide a database request engine that parses, compiles, and optimizes user queries into commands that are interpreted by database objects in the distributed database and (ii) atoms representing data stored in the distributed database, the atoms comprising an index atom comprising a fragment of data and/or metadata associated with an index of a table included in the distributed database,
    wherein a subset of the nodes are configured to store respective copies of the index atom, and
    wherein a first transactional node in the subset of the nodes is designated as a chairman for the index atom and configured to receive a new key value for insertion into a chairman's copy of the index atom, determine, using the database request engine, that the new key value is unique, and broadcast, to each other node in the subset of nodes, instructions to insert the new key value into the index atom in response to determining that the new key value is unique, the instructions causing the nodes in the subset of nodes to attempt to insert the new key value into the respective copies of the index atom.

11. The distributed database of claim 10, wherein the nodes are further configured to communicate with each other via asynchronous messaging.

12. The distributed database of claim 10, wherein one node in the subset of the nodes is configured to transmit a request to the chairman to insert the new key value into the index atom to the chairman.

13. The distributed database of claim 10, wherein the nodes include transactional nodes configured to provide user applications access to the distributed database and archival nodes to maintain respective disk archives of the distributed database.

14. The distributed database of claim 10, wherein each of the nodes is configured to communicate directly with each other node.

15. The distributed database of claim 10, wherein the index atom includes an element pointing to the chairman.

16. The distributed database of claim 10, wherein the index atom includes a list of the nodes in the subset of the nodes.

17. The distributed database of claim 10, wherein the chairman is further configured to insert the new key value into the chairman's copy of the index atom with a local-only flag before determining that the new key value is unique and to clear the local-only flag in response to determining that the new key value is unique.

* * * * *